United States Patent
Große et al.

(10) Patent No.: US 11,107,268 B2
(45) Date of Patent: Aug. 31, 2021

(54) METHODS AND APPARATUS FOR EFFICIENT DATA PROCESSING OF INITIAL CORRESPONDENCE ASSIGNMENTS FOR THREE-DIMENSIONAL RECONSTRUCTION OF AN OBJECT

(71) Applicant: Cognex Corporation, Natick, MA (US)

(72) Inventors: Marcus Große, Jena (DE); Martin Schaffer, Jena (DE); Simon Willeke, Jena (DE); Bastian Harendt, Jena (DE)

(73) Assignee: Cognex Corporation, Natick, MA (US)

( * ) Notice: Subject to any disclaimer, the term of this patent is extended or adjusted under 35 U.S.C. 154(b) by 59 days.

(21) Appl. No.: 16/556,005

(22) Filed: Aug. 29, 2019

(65) Prior Publication Data

US 2020/0082605 A1 Mar. 12, 2020

Related U.S. Application Data

(60) Provisional application No. 62/728,505, filed on Sep. 7, 2018.

(51) Int. Cl.
  *G06T 15/20* (2011.01)
  *G06T 7/593* (2017.01)
  (Continued)

(52) U.S. Cl.
  CPC ........ *G06T 15/205* (2013.01); *G06K 9/00067* (2013.01); *G06T 7/593* (2017.01);
  (Continued)

(58) Field of Classification Search
  CPC ....... G06T 7/593; G06T 7/521; G06T 15/205; G06T 2207/10152; G06T 2207/10021;
  (Continued)

(56) References Cited

U.S. PATENT DOCUMENTS

| 3,576,534 A | 4/1971 | Steinberger |
| 7,158,665 B2 * | 1/2007 | Arima .................. H04N 13/246 382/154 |

(Continued)

FOREIGN PATENT DOCUMENTS

| JP | 2001-243468 A | 9/2001 |
| JP | 2002-131031 A | 5/2002 |

(Continued)

OTHER PUBLICATIONS

Extended European Search Report dated Jan. 31, 2020 in connection with European Application No. EP 19195946.9.

(Continued)

*Primary Examiner* — Brenda C Bernardi
(74) *Attorney, Agent, or Firm* — Wolf, Greenfield & Sacks, P.C.

(57) ABSTRACT

The techniques described herein relate to methods, apparatus, and computer readable media for efficiently processing data of initial correspondence assignments, e.g., for three-dimensional reconstruction of an object. In some aspects, the system includes a processor configured to perform the acts of receiving a first set of images of a scene and a second set of images of the scene, determining a first pixel fingerprint based on the first set of images and a second pixel fingerprint based on the second set of images, generating a first binary pixel fingerprint based on the first pixel fingerprint and a second binary pixel fingerprint based on the second pixel fingerprint, and determining whether there exists a stereo correspondence between the first pixel fingerprint and the second pixel fingerprint at least in part based on comparing the first binary pixel fingerprint and the second binary pixel fingerprint.

19 Claims, 9 Drawing Sheets

(51) Int. Cl.
*G06K 9/00* (2006.01)
*H04N 13/239* (2018.01)
*H04N 13/243* (2018.01)
*H04N 13/00* (2018.01)

(52) U.S. Cl.
CPC ......... *H04N 13/239* (2018.05); *H04N 13/243* (2018.05); *G06T 2200/08* (2013.01); *G06T 2207/10012* (2013.01); *H04N 2013/0081* (2013.01)

(58) Field of Classification Search
CPC ...... G06T 2200/08; G06T 2207/10012; H04N 13/239; H04N 13/243; H04N 2013/0081; G06K 9/00067
See application file for complete search history.

(56) References Cited

U.S. PATENT DOCUMENTS

| | | | |
|---|---|---|---|
| 7,664,314 B2* | 2/2010 | Stein | G06K 9/56 382/154 |
| 9,400,939 B2* | 7/2016 | Lin | G06T 7/40 |
| 2007/0003162 A1* | 1/2007 | Miyoshi | G08G 1/167 382/276 |
| 2018/0027224 A1* | 1/2018 | Javidnia | H04N 13/128 382/154 |
| 2018/0040130 A1* | 2/2018 | Pan | G06T 7/13 |
| 2018/0146178 A1 | 5/2018 | Minami | |
| 2018/0315205 A1 | 11/2018 | Moribe | |
| 2018/0357502 A1* | 12/2018 | Appia | G06T 7/11 |

FOREIGN PATENT DOCUMENTS

| | | |
|---|---|---|
| JP | 2004-178281 A | 6/2004 |
| JP | 2008-093287 A | 4/2008 |
| JP | 2008-157797 A | 7/2008 |
| JP | 2011-216937 A | 10/2011 |
| JP | 2016-180708 A | 10/2016 |
| JP | 2017-116420 A | 6/2017 |
| JP | 2017-225115 A | 12/2017 |
| KR | 101165359 B1 | 7/2012 |
| KR | 2013-0064039 A | 6/2013 |

OTHER PUBLICATIONS

Gühring, Dense 3-D surface acquisition by structured light using off-the-shelf components. Videometrics and Optical Methods for 3D Shape Measurement. Proceedings of SPIE. Dec. 22, 2000; 4309:220-231.

Sansoni et al., Three-dimensional imaging based on Gray-code light projecion: characterization of the measuring algorithm and development of a measuring system for industrial applications. Applied Optics. Optical Society of America. Jul. 1, 1997; 36(19):4463-4472.

Scharstein et al., High-Accuracy Stereo Depth Maps Using Structured Light. Proceedings of the 2003 IEEE Computer Society Conference on Computer Vision and Pattern Recognition (CVPR'03). Jun. 18, 2003; 1:195-202.

Zhang et al., Spacetime Stereo: Shape Recovery for Dynamic Scenes. 2008 IEEE Conference on Computer Vision and Pattern Recognition. Jan. 1, 2003: 2: 8 pages.

Banks et al., Quantitative evaluation of matching methods and validity measures for stereo vision. The International Journal of Robotics Research. Jul. 2001;20(7):512-32.

Coste, CS6320: 3D Computer Vision Project 2 Stereo and 3D Reconstruction from Disparity. The University of Utah, Scientific Computing and Imaging Institute. Feb. 2013:1-33.

Calonder et al., BRIEF: Binary Robust Independent Elementary Features. European Conference on Computer Vision. 2010;778-792.

Salvi et al., Pattern codification strategies in structured light systems. Pattern Recognition. 2004; 26 pages.

Kajiwara et al., Estimation of Bowing Angle for Ritsurei Teaching System using Human Body Contour and Local Features. IEEJ Transactions on Electronics, Information and Systems. Dec. 1, 2015; 135(12):1555-1564. 14 pages.

Kawasaki et al., Tutorial: Active 3D reconstructions of moving objects. Information Processing Society of Japan. Jun. 15, 2011:1-11. 16 pages.

Xu et al., High Accuracy Three-Dimensional Measurement of Lambertian and Specular Surfaces Using Stereo Cameras and Phase-Shift. Information Processing Society of Japan. Jan. 12, 2007:45-51. 10 pages.

* cited by examiner 702    (i, j): [$v_1, v_2, \ldots, v_N$]

752    (i', j'): [$v_1', v_2', \ldots, v_N'$]

⬇ Normalization (Optional)

704    (i, j): [$\hat{v}_1, \hat{v}_2, \ldots, \hat{v}_N$]

754    (i', j'): [$\hat{v}_1', \hat{v}_2', \ldots, \hat{v}_N'$]

⬇ Fingerprint Generation 706    (i, j): [$b_1, b_2, \ldots, b_N$]

756    (i', j'): [$b_1', b_2', \ldots, b_N'$]

700

FIG. 7

METHODS AND APPARATUS FOR EFFICIENT DATA PROCESSING OF INITIAL CORRESPONDENCE ASSIGNMENTS FOR THREE-DIMENSIONAL RECONSTRUCTION OF AN OBJECT

CROSS-REFERENCE TO RELATED APPLICATIONS

This application claims priority to U.S. provisional application Ser. No. 62/728,505, filed Sep. 7, 2018, and entitled "METHODS AND APPARATUS FOR EFFICIENT DATA PROCESSING OF INITIAL CORRESPONDENCE ASSIGNMENTS FOR THREE-DIMENSIONAL RECONSTRUCTION OF AN OBJECT," which is hereby incorporated by reference in its entirety.

TECHNICAL FIELD

The techniques described herein relate generally to three-dimensional (3D) reconstruction from two-dimensional images of an object or a scene, and in particular techniques to efficiently process data of initial correspondence assignments between pairs of two-dimensional images.

BACKGROUND

The use of advanced machine vision systems and their underlying software is increasingly employed in a variety of manufacturing and quality control processes. Machine vision enables quicker, more accurate and repeatable results to be obtained in the production of both mass-produced and custom products. Typical machine vision systems include one or more cameras directed at an area of interest, an illumination source that directs appropriate illumination on the area of interest, a frame grabber/image processing elements that capture and transmit images, a computer or onboard processing device for running the machine vision software application and manipulating the captured images, and a user interface for interaction.

One form of 3D vision system is based upon stereo cameras employing at least two cameras arranged in a side-by-side relationship with a baseline of one-to-several inches between the two cameras. Stereo-vision based systems are typically based on epipolar geometry and image rectification. They may use correlation-based methods or combining with relaxation techniques to find the correspondence in rectified images from two or more cameras. However, conventional stereo vision systems are limited in their ability to create accurate and fast three-dimensional data reconstructions of objects and/or scenes fast, due to computational effort required.

SUMMARY

In accordance with the disclosed subject matter, apparatus, systems, and methods are provided for efficiently processing data of initial correspondence assignments between pairs of two-dimensional images, e.g., for three-dimensional reconstruction of an object or a scene from a pair of two-dimensional images. The inventors have recognized that, while conventional systems may apply some sort of normalized cross-correlation to pairs of two-dimensional images to determine stereo correspondence, these systems often have to spend great computational effort to perform the necessary calculations (e.g., due to the number of pixel values that need to be processed, the size of those pixel values, etc.). The inventors have developed techniques, as discussed further herein, that improve three-dimensional data reconstruction techniques by efficiently processing initial correspondence assignments for pairs of two-dimensional images, and particularly, for pairs of stereo-temporal image sequences. Stereo-temporal image sequences include sets of images of an object or a scene captured over time and from different perspectives. The inventors note that the described systems and methods are particularly novel in deriving a binary pixel fingerprint for each pixel fingerprint in a stereo-temporal image sequence.

In some aspects, the described systems and methods provide for a system for establishing stereo correspondence between two images. The system may include two or more cameras (or sensors) arranged to capture images of a scene in a manner consistent to produce stereo image correspondence, e.g., by situating the two or more cameras to capture different perspectives of the scene. Alternatively, the system may include one or more cameras (or sensors) with one or more inverse cameras (or projectors) arranged to capture images of a scene in a manner consistent to produce pairwise stereo image correspondences. One or more projectors may be used to project a series of light patterns on the scene, and a set of images may be captured from each camera. The set of images captured from each camera may be referred to as a temporal image. Each image in the set of images may correspond to one of the series of projected light patterns.

Subsequently, a temporal image and a binary temporal image may be determined for each camera. A pixel fingerprint at position (i,j) in a temporal image may include an ordered set of pixel values gathered at position (i,j) and/or different positions in space and/or time relative to position (i,j), from the set of images captured from each camera. In some embodiments, a pixel fingerprint at position (i,j) in a temporal image may include an ordered set of pixel values gathered at position (i,j). Additionally or alternatively, in some embodiments, the pixel fingerprint at position (i,j) in the temporal image may include an ordered set of pixel values gathered at different positions in space, relative to position (i,j), from the set of images captured from each camera. Additionally or alternatively, in some embodiments, the pixel fingerprint at position (i,j) in the temporal image may include an ordered set of pixel values gathered at different positions in time, relative to position (i,j), from the set of images captured from each camera. Additionally or alternatively, in some embodiments, the pixel fingerprint at position (i,j) in the temporal image may include an ordered set of pixel values gathered at different positions in space and time, relative to position (i,j), from the set of images captured from each camera.

A binary pixel fingerprint at position (i,j) in a binary temporal image is determined by comparing each set value in a pixel fingerprint at location (i,j) to one or more thresholds, and replacing the set value with a zero or a one, based on the one or more thresholds. Optionally, the set values in the pixel fingerprint may be normalized prior to being compared to one or more thresholds to generate the corresponding binary pixel fingerprint. A search (e.g. along epi-polar lines) may be used to determine correspondence between binary pixel fingerprints from each camera. One or more binary comparisons between pixels (e.g. on or near the epipolar line) may be executed from the binary temporal image of each camera, and pixel correspondence may be determined based on the results of those comparisons.

In some aspects, a system, a method, and/or a computer-readable storage medium for determining stereo correspondence between a first pixel fingerprint of a first set of images and a second pixel fingerprint of a second set of images may be provided.

The system may include a processor configured to perform the act of receiving, from one or more image sensors, a first set of images of a scene and a second set of images of the scene. The second set of images may be captured from a different perspective than the first set of images.

The processor may be configured to perform the act of determining a first pixel fingerprint based on the first set of images. The first pixel fingerprint may include a first set of pixel values at a first pixel position in each image in the first set of images over time. The processor may be configured to perform the act of determining a second pixel fingerprint based on the second set of images. The second pixel fingerprint may include a second set of pixel values at a second pixel position in each image in the second set of images over time.

The processor may be configured to perform the act of generating, based on the first pixel fingerprint, a first binary pixel fingerprint. The first binary pixel fingerprint may include a first set of binary values generated by comparing each of the first set of pixel values to a threshold. The processor may be configured to perform the act of generating, based on the second pixel fingerprint, a second binary pixel fingerprint. The second binary pixel fingerprint may include a second set of binary values generated by comparing each of the second set of pixel values to the threshold.

The processor may be configured to perform the act of determining whether there exists a stereo correspondence between the first pixel fingerprint of the first set of images and the second pixel fingerprint of the second set of images at least in part based on comparing the first binary pixel fingerprint and the second binary pixel fingerprint.

In some embodiments, the first set of images and/or the second set of images of the scene are received from an inverse camera/projector.

In some embodiments, the system may include a projector configured to project a set of light patterns on the scene. Each image in the first set of images may be captured using a different light pattern from the set of light patterns.

In some embodiments, the set of light patterns may include a fixed pattern that is translated, rotated, and/or morphed to project a different light pattern on the scene.

In some embodiments, the first pixel fingerprint may include the first set of pixel values as an ordered set corresponding to a temporal order of the first set of images, and the second pixel fingerprint may include the second set of pixel values as an ordered set corresponding to the temporal order of the second set of images.

In some embodiments, generating the first set of binary values may include assigning, for each pixel value in the first set of pixel values, a zero if the pixel value is above the threshold or a one if the pixel value is not above the threshold.

In some embodiments, comparing the first binary pixel fingerprint and the second binary pixel fingerprint may include comparing corresponding binary values in the first and second binary pixel fingerprints.

In some embodiments, the processor may be configured to perform the act of normalizing the first pixel fingerprint. Normalizing the first pixel fingerprint may include normalizing the first set of pixel values, at the first pixel position in each image in the first set of images, to create a first normalized pixel fingerprint comprising the first set of normalized pixel values. The processor may be configured to perform the act of normalizing the second pixel fingerprint.

Normalizing the second pixel fingerprint may include normalizing the second set of pixel values, at the second pixel position in each image in the second set of images, to create a second normalized pixel fingerprint comprising second set of normalized pixel values. Generating the first binary pixel fingerprint may include generating the first binary pixel fingerprint based on the first normalized pixel fingerprint. Generating the second binary pixel fingerprint may include generating the second binary pixel fingerprint based on the second normalized pixel fingerprint.

In some embodiments, the processor may be configured to perform the act of generating, based on the first normalized pixel fingerprint, a third binary pixel fingerprint. The third binary pixel fingerprint may include a third set of binary values generated by comparing an absolute value of each of the first set of normalized pixel values to a confidence threshold. The processor may be configured to perform the act of generating, based on the second normalized pixel fingerprint, a fourth binary pixel fingerprint. The fourth binary pixel fingerprint may include a fourth set of binary values generated by comparing an absolute value of each of the second set of normalized pixel values to the confidence threshold.

In some embodiments, comparing the first binary pixel fingerprint and the second binary pixel fingerprint may include comparing an OR value of corresponding binary values in the first, third, and fourth binary pixel fingerprints and an OR value of corresponding binary values in the second, third, and fourth binary pixel fingerprints.

In some embodiments, comparing the first binary pixel fingerprint and the second binary pixel fingerprint may include determining whether corresponding binary values in the first and second binary pixel fingerprints are within a threshold hamming distance.

In some embodiments, prior to determining the first pixel fingerprint in the first set of images, the processor may be configured to apply an image filter to each image in the first set of images.

In some embodiments, determining whether there exists a stereo correspondence between the first pixel fingerprint of the first set of images and the second pixel fingerprint of the second set of images may include performing a successive temporal correlation to yield a correlation value between the first pixel fingerprint and the second pixel fingerprint and determining, based on the correlation value exceeding a correlation threshold and prior correlation values for prior pairs of pixel fingerprints, that a potential correspondence exists between the first pixel fingerprint and the second pixel fingerprint.

In some embodiments, determining whether there exists a stereo correspondence between the first pixel fingerprint of the first set of images and the second pixel fingerprint of the second set of images may include performing a hole filling operation to interpolate initial correspondences for pixel fingerprints not yet determined to have a potential correspondence to another pixel fingerprint.

In some embodiments, the first pixel position and/or the second pixel position may be selected based on a skipping parameter.

In some embodiments, the first pixel position, $(i_1, j_1)$, may be selected based on the skipping parameter, $S$, such that $i_1$ modulo $S=0$ and $j_1$ modulo $S=0$.

In some aspects, a system, a method, and/or a computer-readable storage medium for determining stereo correspondence between a first pixel fingerprint of a first set of images and a second pixel fingerprint of a second set of images may be provided.

The system may include a processor configured to perform the act of receiving, from one or more image sensors, a first set of images of a scene and a second set of images of the scene. The second set of images may be captured from a different perspective than the first set of images.

The processor may be configured to perform the act of determining a first pixel fingerprint based on the first set of images. The first pixel fingerprint may include a first set of pixel values at different positions in space and/or time relative to a first pixel position in each image in the first set of images. The processor may be configured to perform the act of determining a second pixel fingerprint based on the second set of images. The second pixel fingerprint may include a second set of pixel values at different positions in space and/or time relative to at a second pixel position in each image in the second set of images.

The processor may be configured to perform the act of generating, based on the first pixel fingerprint, a first binary pixel fingerprint. The first binary pixel fingerprint may include a first set of binary values generated by comparing each of the first set of pixel values to a threshold. The processor may be configured to perform the act of generating, based on the second pixel fingerprint, a second binary pixel fingerprint. The second binary pixel fingerprint may include a second set of binary values generated by comparing each of the second set of pixel values to the threshold.

The processor may be configured to perform the act of determining whether there exists a stereo correspondence between the first pixel fingerprint of the first set of images and the second pixel fingerprint of the second set of images at least in part based on comparing the first binary pixel fingerprint and the second binary pixel fingerprint.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 7 shows an illustrative process for generating a binary pixel fingerprint for pixel fingerprints from a pair of images, according to some embodiments.

DETAILED DESCRIPTION

The techniques discussed herein can be used for efficiently processing data of initial correspondence assignments between pairs of two-dimensional images. The inventors have recognized that, while conventional systems are known to apply normalized cross-correlation to pairs of two-dimensional images to determine stereo correspondence, these systems have to spend great computational effort to perform the necessary calculations. The inventors have developed techniques, as discussed further herein, that improve three-dimensional data reconstruction by efficiently processing data of initial correspondence assignments for pairs of two-dimensional images, and particularly, for pairs of stereo-temporal image sequences. The inventors note that the described systems and methods are particularly novel in deriving a binary pixel fingerprint for each pixel fingerprint in the stereo-temporal image sequence.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
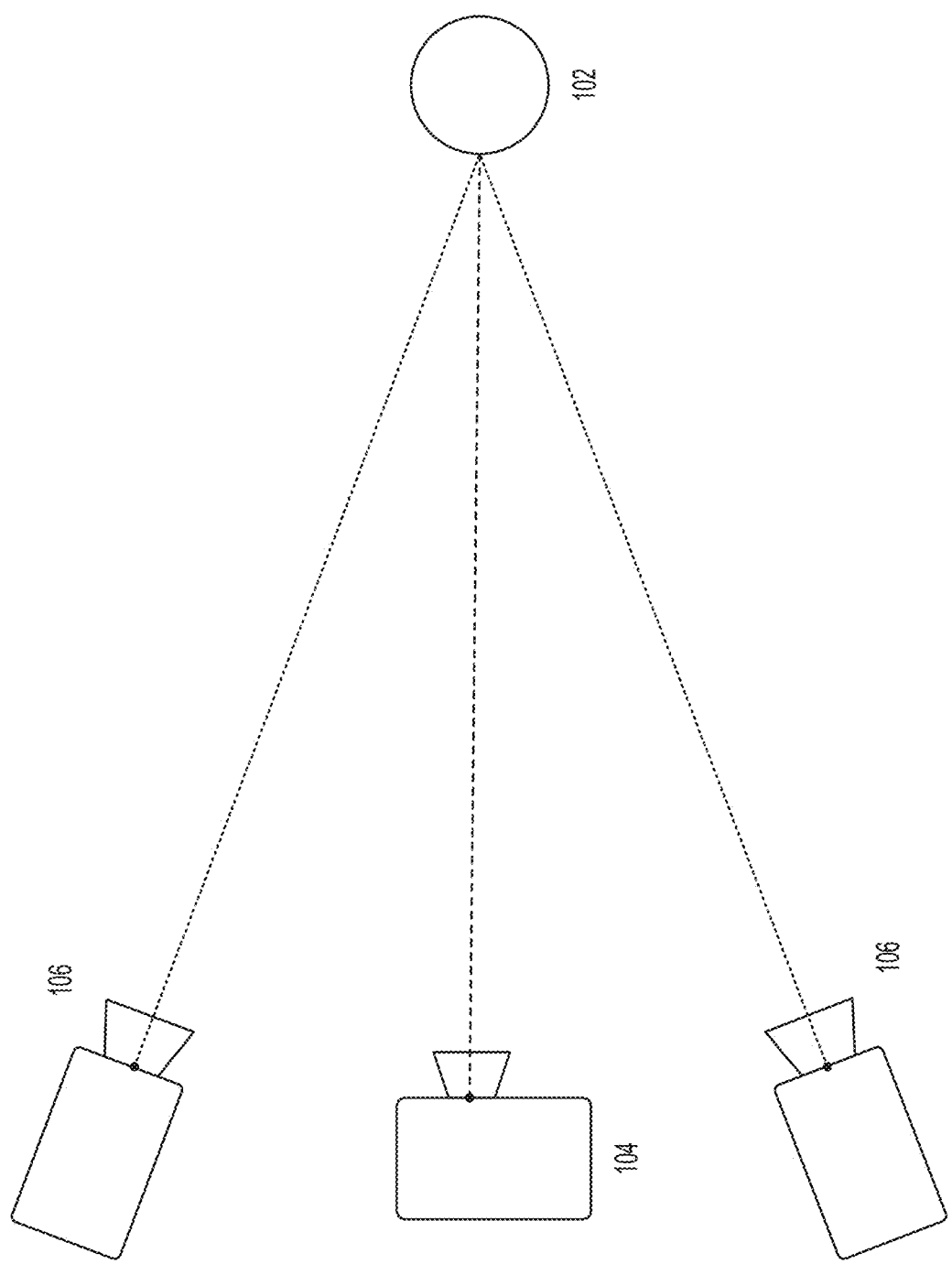
FIG. 1 shows an illustrative embodiment where a projector and two cameras are arranged to capture images of a scene in a manner consistent to produce stereo image correspondence, according to some embodiments.

FIG. 1 shows an illustrative embodiment 100 where a projector 104 and two cameras 106 are arranged to capture images of an object or scene 102 in a manner consistent to produce stereo image correspondence. In some embodiments, a statistical pattern projector is employed in order to temporally code image sequences of an object captured using multiple cameras. For example, the projector may project a translating pattern on the object, and each camera may capture an image sequence including 12-16 images (or some other number of images) of the object. Each image comprises a set of pixels that make up the image. In some embodiments, the light pattern may shift in horizontal and/or vertical directions such that the pattern rotates over the object or scene (e.g., without the pattern itself rotating clockwise or counter-clockwise). Each of the cameras 106 can include a charge-coupled device (CCD) image sensor, a complementary metal-oxide semiconductor (CMOS) image sensor, or another suitable image sensor. In some embodiments, each of the cameras 106 can have a rolling shutter, a global shutter, or another suitable shutter type. In some embodiments, each of the cameras 106 can have a GigE Vision interface, a Universal Serial Bus (USB) interface, a coaxial interface, a FIREWIRE interface, or another suitable interface. In some embodiments, each of the cameras 106 can have one or more smart functions. In some embodiments, each of the cameras 106 can have a C-mount lens, an F-mount lens, an S-mount lens, or another suitable lens type. In some embodiments, each of the cameras 106 can have a spectral filter adapted to a projector, e.g., projector 104, to block environmental light outside the spectral range of the projector.

Figure 2:
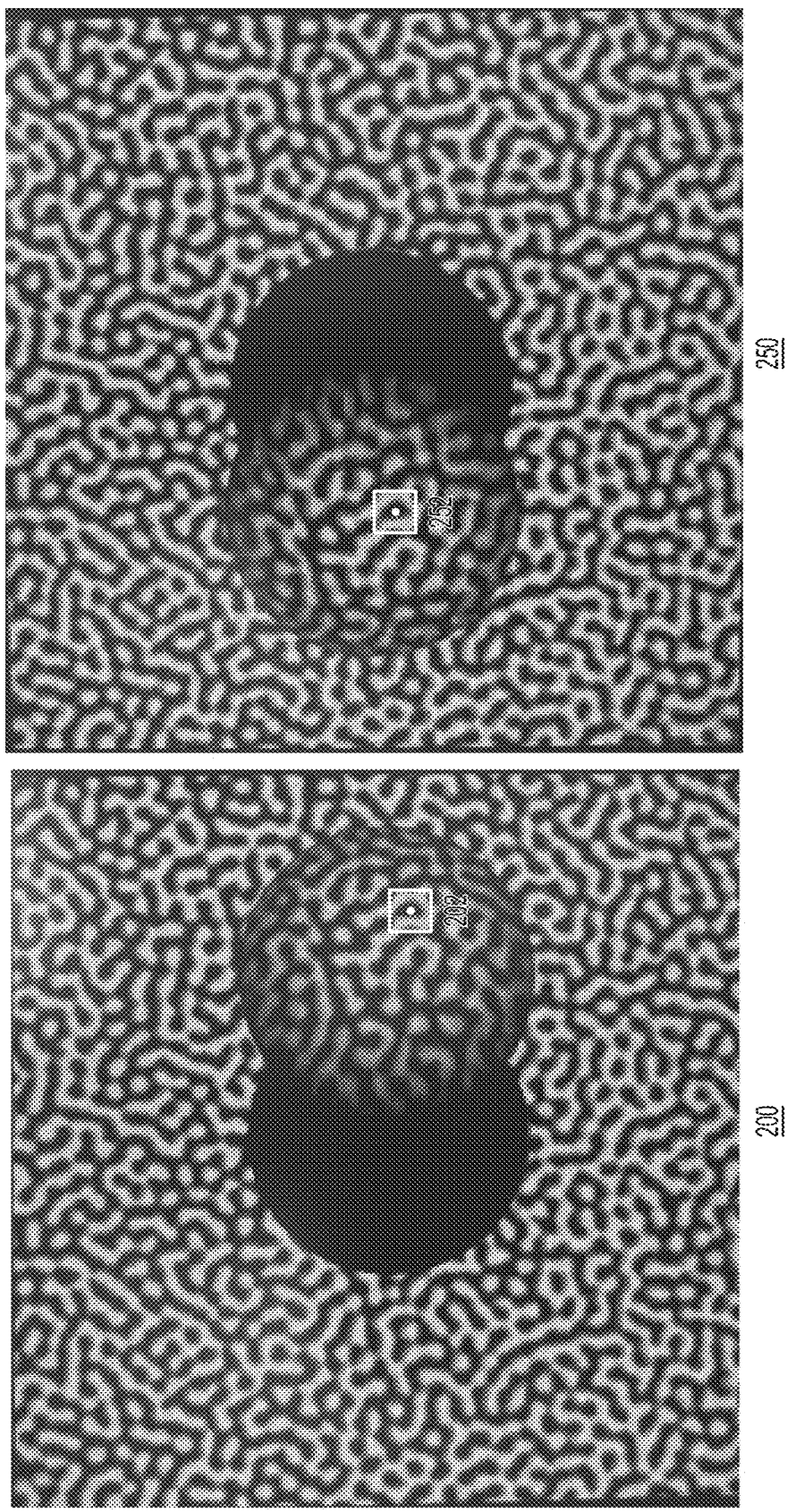
FIG. 2 shows an exemplary pair of stereo images corresponding to one of a series of projected light patterns, according to some embodiments.

FIG. 2 shows an exemplary pair of stereo images 200 and 250 corresponding to one of a series of projected light patterns. For example, the projector 104 may project a light pattern on the object, and the cameras 106 may capture the stereo images 200 and 250. In some embodiments, in order to reconstruct three-dimensional data from stereo image sequences from two cameras, corresponding pairs of pixels, such as pixels 202 and 252, may need to be found between the images from each camera.

Figure 3:
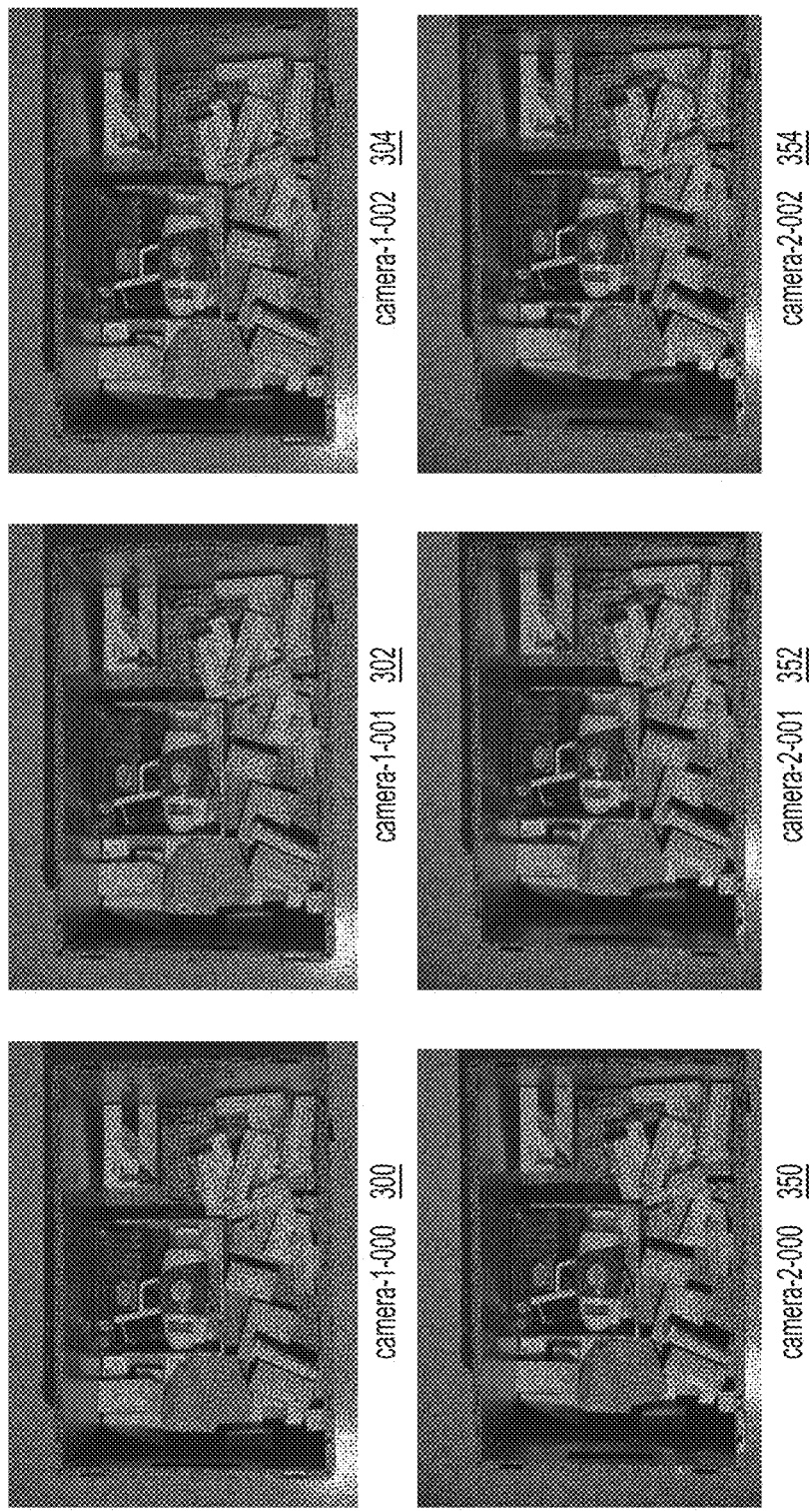
FIG. 3 shows an exemplary pair of stereo-temporal image sequences of a scene, according to some embodiments.
Figure 4:
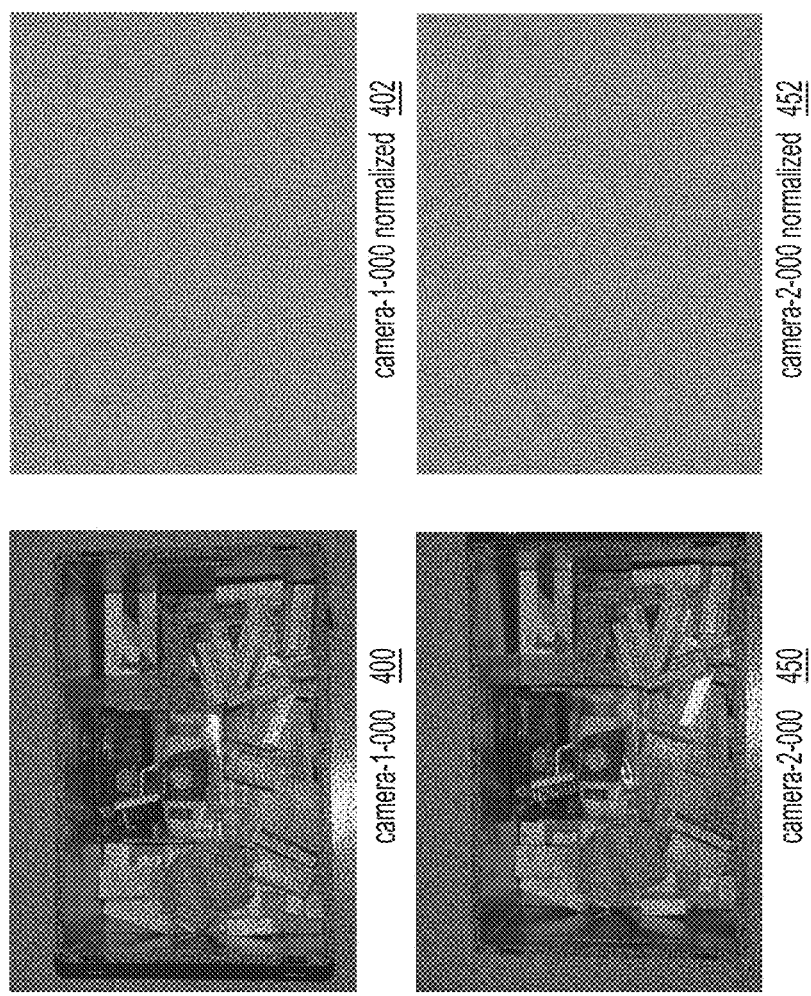
FIG. 4 shows an exemplary pair of stereo images and corresponding normalized images, according to some embodiments.

FIG. 3 shows an exemplary pair of stereo-temporal image sequences of a scene. For example, the projector 104 may successively project different light patterns on the scene, and one of the cameras 106 may capture images 300, 302, and 304, while the other one of the cameras 106 may capture image 350, 352, and 354. In some embodiments, the captured images may be normalized in order to apply the techniques of the described systems and methods. FIG. 4 shows an exemplary pair of stereo images 400 and 450 and corresponding normalized images 450 and 452. As shown, the stereo images 400 and 450 may be processed to include the light pattern of the stereo images 400 and 450, while reducing the actual scene and/or object of the images 400 and 450. In some embodiments, knowledge of a type of the light pattern projected may not be required in order to reduce the actual scene and/or object of the images 400 and 450.

Figure 5:
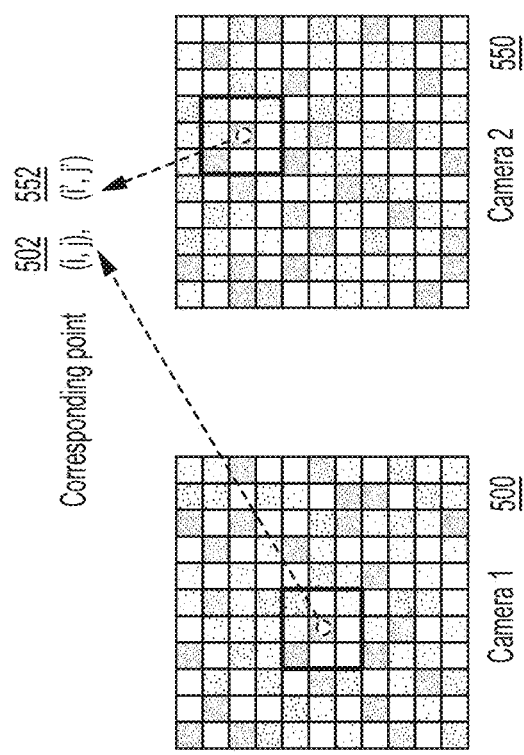
FIG. 5 shows an illustrative pair of stereo images of a scene, according to some embodiments.
Figure 6:
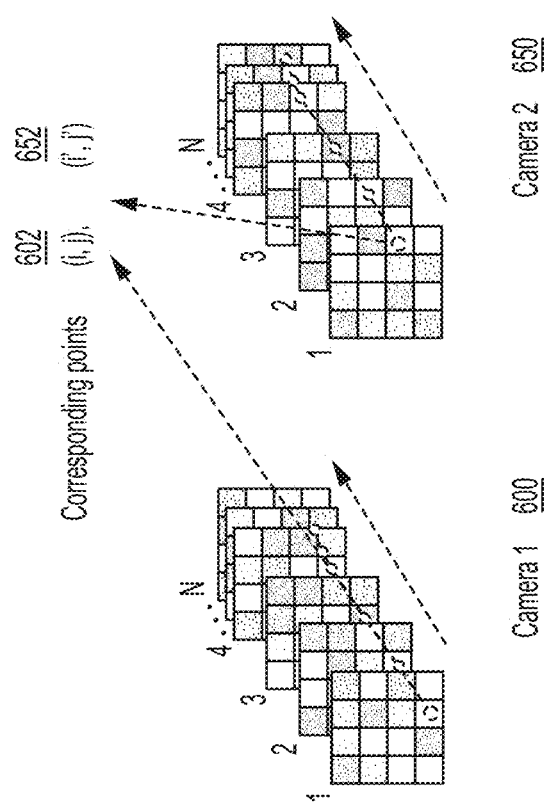
FIG. 6 shows an illustrative pair of stereo-temporal image sequences corresponding to a series of light patterns projected on a scene, according to some embodiments.

FIG. 5 shows an illustrative pair of stereo images 500 and 550 (and associated pixels) with corresponding pixels 502 and 552, which represent the same portion of the pattern projected in the two images 500 and 550. For example, as discussed above, the projector 104 may project a light pattern on the scene, and the cameras 106 may capture the stereo images 500 and 550. The captured stereo images 500 and 550 can be used to identify correspondences across the two pixels. In some embodiments, sequences of stereo images captured over time are used to identify correspondences. Following from the single pair of stereo images shown in FIG. 5, FIG. 6 shows, when the projector 104 successively projects different light patterns on the scene over time, the cameras 106 may capture the stereo-temporal image sequences 600 and 650 with corresponding pixel fingerprints 602 and 652. Each of cameras 106 may capture a sequences of images 1, 2, 3, 4, . . . N over time. Pixel fingerprints 602 and 652 are based on the pixels (i,j) and (i',j') across the stereo-temporal image sequences 600 and 650, respectively. Over time, each pixel fingerprint includes an ordered list of gray values: G_i_j_t where t indicates the discrete temporal instances 1, 2, 3, 4, . . . N.

In some embodiments, a normalized cross-correlation algorithm using the temporal images or only a subset of the temporal images may be applied to the two image sequences in order to determine the corresponding pairs of pixels from each image (e.g., that have similar temporal gray values). However, such a process may require great computational effort to perform the necessary calculations. This process may be improved by efficiently processing data of initial correspondence assignments, and particularly, deriving a binary pixel fingerprint for each pixel fingerprint in a stereo-temporal image sequence, described further below.

In some embodiments, for each pixel of the first camera, the potentially corresponding pixels are retrieved by performing a normalized cross-correlation with all feasible candidates along the epipolar line in the second camera with a threshold to compensate for deviation due to calibration of the cameras, e.g., +/− one pixel or another suitable value. In one example, this approximates to calculating a normalized cross correlation for 3000 potential pairs which amounts to approximately $x_{res} \times y_{res} \times N \times 3000$ multiplications for N number of images of dimension $x_{res}$ by $y_{res}$ (e.g., approximately $94 \times 10^9$ for N=24).

In some aspects, the described systems and methods relate to a technological improvement of existing techniques, which utilizes an algorithmic approach to reducing the computational effort of the initial correspondence assignment up to a factor of, e.g., 200, or another suitable factor (e.g., compared to the above described approach). The computational effort may be reduced by performing the computationally heavy cross-correlation only on a subset of potential correspondences, and/or by reducing the amount of data processed to compute the correspondences.

Figure 9:
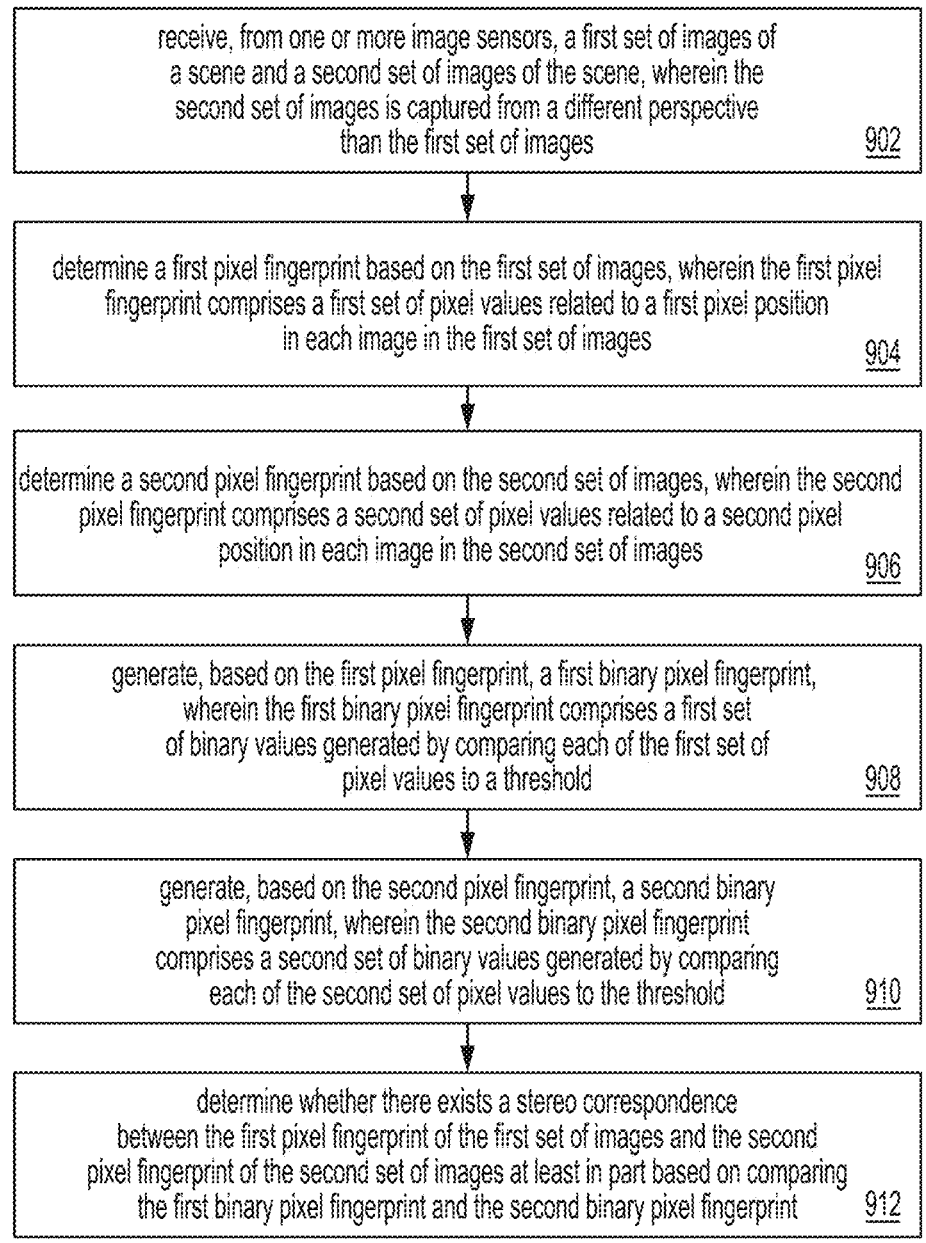
FIG. 9 shows an illustrative computerized method for efficiently processing data of initial correspondence assignments for stereo-temporal image sequences, according to some embodiments.

FIG. 9 shows an illustrative computerized method 900 for efficiently processing data of initial correspondence assignments for stereo-temporal image sequences, according to some embodiments. Method 900 may be performed on any suitable computing system (e.g., a general purpose computing device (CPU), a graphics processing unit (GPU), a field-programmable gate array device (FPGA), an application-specific integrated circuit device (ASIC), an ARM-based device, or another suitable computing system), as aspects of the technology described herein are not limited in this respect. In some embodiments, one or more cameras may generate a binary pixel fingerprint per pixel in a captured image. In this case, the bandwidth needed for transmitting data from the cameras to the system may be reduced.

At act 902, the system may receive a first set of images of a scene and a second set of images of the scene from one or more image sensors. The second set of images is captured from a different perspective than the first set of images. For example, the system may receive a temporal sequence of 12-16 images, or another suitable number of images, of a scene, from the two cameras described with respect to FIG. 1. In some embodiments, a projector is configured to project a set of light patterns on the scene. Each image in the first set of images and/or the second set of images may be captured using a different light pattern from the set of light patterns. For example, a light pattern may be projected on the scene and the two cameras may capture respective images as shown in FIG. 2. In another example, the set of light patterns may be successively projected on the scene and two cameras may capture respective stereo-temporal image sequences as shown in FIG. 3. In some embodiments, the set of light patterns may include a fixed pattern that is translated, rotated, and/or morphed to change the light pattern projected on the scene. In some embodiments, the set of light patterns may include a moving optical pattern. In some embodiments, the moving optical pattern may include an optical pattern translating along a circular path. In some embodiments, the light pattern may shift in horizontal and/or vertical directions such that the pattern rotates over the object (e.g., without the pattern itself rotating clockwise or counter-clockwise).

Figure 8:
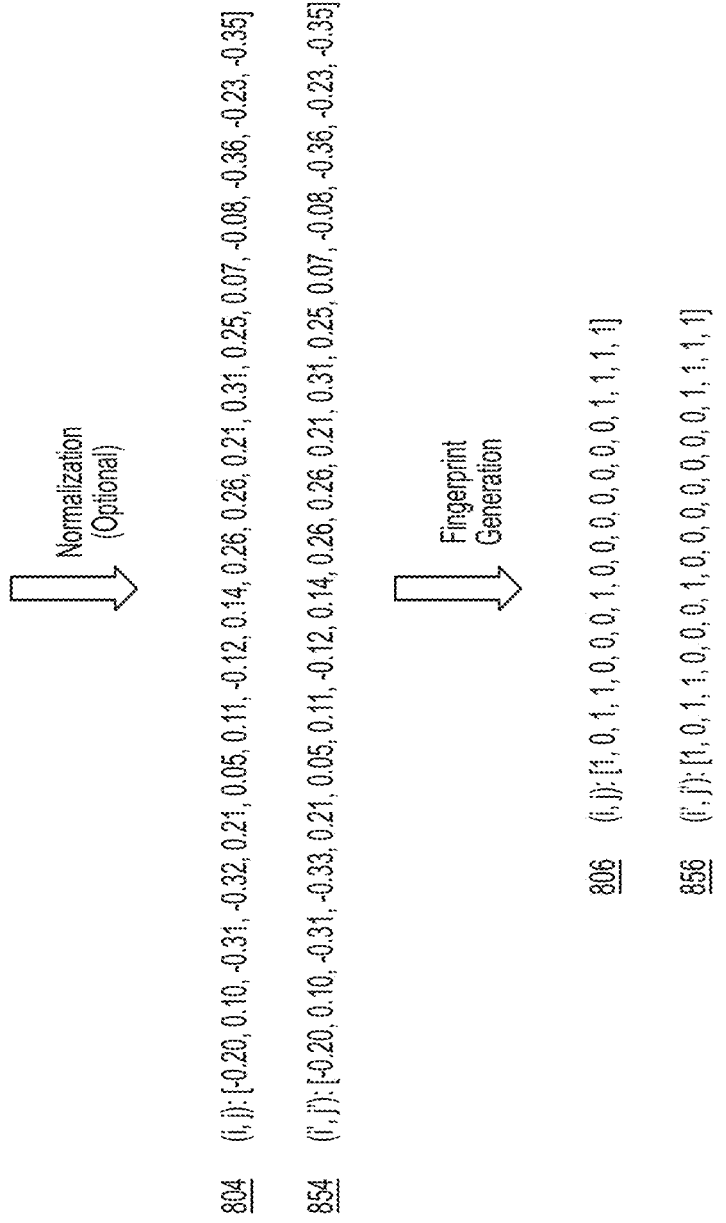
FIG. 8 shows an example of a binary pixel fingerprint being generated for exemplary pixel fingerprints from a pair of images, according to some embodiments.

At act 904, the system may determine a first pixel fingerprint based on the first set of images. In some embodiments, the first pixel fingerprint includes a first set of pixel values at a first pixel position in each image in the first set of images over time. In some embodiments, the first pixel fingerprint may include a first set of pixel values at different positions in space and/or time relative to a first pixel position in each image in the first set of images. FIG. 8 shows examples of such a pixel fingerprint. In some embodiments, the first pixel fingerprint includes the first set of pixel values as an ordered set corresponding to a temporal order of the first set of images. FIGS. 5-6 show examples of such pixel positions over time and corresponding pixel values in an ordered set of images. In some embodiments, prior to determining the first pixel fingerprint in the first set of images, the system applies a weak Gaussian filter to each image in the first set of images. In some embodiments, the system selects the first pixel position based on a skipping parameter. For example, the system may select the first pixel position, $(i_1, j_1)$, based on the skipping parameter, S, such that $i_1$ modulo S=0 and $j_1$ modulo S=0.

At act 906, the system may determine a second pixel fingerprint based on the second set of images. In some embodiments, the second pixel fingerprint includes a second set of pixel values at a second pixel position in each image in the second set of images over time. In some embodiments, the second pixel fingerprint may include a second set of pixel values at different positions in space and/or time relative to a second pixel position in each image in the second set of images. FIG. 8 shows examples of such a pixel fingerprint. In some embodiments, the second pixel fingerprint includes the second set of pixel values as an ordered set corresponding to the temporal order of the second set of images. In some embodiments, prior to determining the second pixel fingerprint in the second set of images, the system applies a weak Gaussian filter to each image in the second set of images. FIGS. 5-6 show examples of such pixel positions over time and corresponding pixel values in an ordered set of images. In some embodiments, the system selects the second pixel position based on the skipping parameter. For example, the system may select the second pixel position, $(i_2, j_2)$, based on the skipping parameter, S, such that $i_2$ modulo S=0 and $j_2$ modulo S=0.

At act 908, the system may generate a first binary pixel fingerprint based on the first pixel fingerprint. The first binary pixel fingerprint includes a first set of binary values generated by comparing each of the first set of pixel values to a threshold. In some embodiments, generating the first set of binary values includes assigning, for each pixel value in the first set of pixel values, a zero if the pixel value is above the threshold or a one if the pixel value is not above the threshold. FIG. 8 shows examples of such a pixel fingerprint.

In some embodiments, the system may normalize the first pixel fingerprint by normalizing the first set of pixel values, at the first pixel position in each image in the first set of images, to create a first normalized pixel fingerprint including the first set of normalized pixel values. FIG. 4 shows exemplary stereo images and corresponding normalized images. In such embodiments, the system may generate the first binary pixel fingerprint based on the first normalized pixel fingerprint in the manner described with respect to the first pixel fingerprint. FIG. 7 and related description show an illustrative process corresponding to this technique, and FIG. 8 and related description show examples of such a binary pixel fingerprint being generated according to this technique.

At act 910, the system may generate a second binary pixel fingerprint based on the second pixel fingerprint. The second binary pixel fingerprint includes a second set of binary values generated by comparing each of the second set of pixel values to the threshold. In some embodiments, generating the second set of binary values includes assigning, for each pixel value in the second set of pixel values, a zero if the pixel value is above the threshold or a one if the pixel value is not above the threshold. FIG. 8 shows examples of such a pixel fingerprint.

In some embodiments, the system may normalize the second pixel fingerprint by normalizing the second set of pixel values, at the second pixel position in each image in the second set of images, to create a second normalized pixel fingerprint including the second set of normalized pixel values. FIG. 4 shows exemplary stereo images and corresponding normalized images. In such embodiments, the system may generate the second binary pixel fingerprint based on the second normalized pixel fingerprint in the manner described with respect to the second pixel fingerprint. FIG. 7 and related description show an illustrative process corresponding to this technique, and FIG. 8 and related description show examples of such a binary pixel fingerprint being generated according to this technique.

At act 912, the system may determine whether there exists a stereo correspondence between the first pixel fingerprint of the first set of images and the second pixel fingerprint of the second set of images at least in part based on comparing the first binary pixel fingerprint and the second binary pixel fingerprint. In some embodiments, comparing the first binary pixel fingerprint and the second binary pixel fingerprint includes comparing corresponding binary values in the first and second binary pixel fingerprints. In some embodiments, comparing the first binary pixel fingerprint and the second binary pixel fingerprint includes determining whether corresponding binary values in the first and second binary pixel fingerprints are within a threshold hamming distance.

In some embodiments, the system may generate a third binary pixel fingerprint based on the first normalized pixel fingerprint by comparing an absolute value of each of the first set of normalized pixel values to a confidence threshold. In some embodiments, the system may generate a fourth binary pixel fingerprint based on the second normalized pixel fingerprint by comparing an absolute value of each of the second set of normalized pixel values to the confidence threshold. In some embodiments, comparing the first binary pixel fingerprint and the second binary pixel fingerprint includes comparing (i) an OR value of corresponding binary values in the first, third, and fourth binary pixel fingerprints, and (ii) an OR value of corresponding binary values in the second, third, and fourth binary pixel fingerprints.

In some embodiments, the system may determine whether there exists a stereo correspondence between a first pixel fingerprint of the first set of images and a second pixel fingerprint of the second set of images by performing a successive temporal correlation to yield a correlation value between the first pixel fingerprint and the second pixel fingerprint and determining, based on the correlation value exceeding a correlation threshold and prior correlation values for prior pairs of pixel fingerprints, that a potential correspondence exists between the first pixel fingerprint and the second pixel fingerprint. In some embodiments, the system may perform a hole filling operation to interpolate initial correspondences for pixel fingerprints not yet determined to have a potential correspondence to another pixel fingerprint.

In some embodiments, the described systems and methods provide for a process that is suitable for implementation on a computing system. In some embodiments, the computing system (not shown in FIG. 1) receives a pair of stereo-temporal image sequences from the image sensors or cameras (e.g., as described with respect to act 902). As discussed further herein, for example, the computing system can be a general purpose computing device (CPU), a graphics processing unit (GPU), a field-programmable gate array device (FPGA), an application-specific integrated circuit device (ASIC), an ARM-based device, or another suitable computing system). In some embodiments, one or more cameras may generate a binary pixel fingerprint per pixel in a captured image. In this case, the bandwidth needed for transmitting data from the cameras to the system may be reduced.

The system can determine pixel fingerprints for each image sequence (e.g., as described with respect to acts 904 and/or 906). In some embodiments, the system can smooth the image sequences, such as by using a weak Gaussian filter per image. In some embodiments, the system can optionally normalize the image sequences per pixel fingerprint. Based on the normalized image sequences or normalized pixel fingerprints, a binary sequence or binary pixel fingerprint is created for each pixel of each camera, e.g., BINARY1_i_j for a first camera, camera 1 (e.g., as described with respect to act 908), and BINARY1_i'_j' for a second camera, camera 2 (e.g., as described with respect to act 910). For a given pixel, a representative binary value is determined for the pixel. For example, the system can assign, based on the temporal normalized pixel value, a 0 or 1 for the pixel value. For example, the system can assign the 0 or 1 by determining whether the normalized value is >=0 or <0 (or another suitable threshold). For example, the system may assign a 1 for a value that is >=0 (e.g., indicating brighter than average) and a 0 for a value that is <0 (e.g., indicating darker than average).

The system can initiate a search for potential correspondences using the (normalized or non-normalized) binary pixel fingerprints (e.g., as described with respect to act 912). For a given pixel of camera 1, the search space in camera 2 may be initially limited to the epipolar line with a defined threshold, e.g., SAFETY_THRESHOLD. For a potential correspondence, for example, the system can check whether the pair of binary sequences is consistent (or equivalent) for potential correspondences, e.g., whether BINARY1_i_j=BINARY1_i'_j'.

Alternatively or additionally, for a potential correspondence, the system can check whether the pair of binary sequences is within a certain distance threshold. For example, the system can check whether the pair of binary sequences is within a hamming distance threshold, HD_THRESHOLD. For example, the system can determine whether HAMMING_DISTANCE (BINARY1_i_j, BINARY1_i'_j')<HD_THRESHOLD. In some embodiments, the hamming distance between the two binary sequences of equal length is the number of positions at which the corresponding values are different. For example, the hamming distance between 1011101 and 1001001 is 2.

Alternatively or additionally, based on the normalized image sequences, the system can generate another pair of binary sequences, BINARY2_i_j and BINARY2_i'_j', for each pixel of each camera. This pair of binary sequences can represent a confidence flag for the initial pair of binary sequences. For a given pixel, a representative binary value is determined for the pixel. For example, the system can assign, based on the temporal normalized pixel value, a 0 or 1 depending on whether the absolute normalized value is below a confidence threshold, CONFIDENCE_THRESHOLD. For a potential correspondence, the system can check whether BINARY1_i_j|BINARY2_i_j|BINARY2_i'_j'==BINARY1_i'_j'|BINARY2_i'_j'|BINARY2_i_j.

If the pair of binary sequences is similar (e.g., is consistent) according to one or more metrics discussed above, the system can conduct a successive temporal correlation. For example, if the correlation yields a value above an initial correlation threshold, INITIAL_CORRELATION_THRESHOLD, and the correlation is larger than any previous potential correspondence for (i, j), the pair of pixels, (i, j) and (i', j'), can be marked as a potential correspondence. In some embodiments, for a specific pixel (i, j) in camera 1, the system may identify a similar or matching pixel (i', j') in camera 2 (e.g., along the epipolar line, in the entire image of camera 2, or another suitable portion) using their respective binary sequences or fingerprints as a metric. If the metric is fulfilled, the system may store the resulting pair, (i, j) and (i', j'), in a list and perform the temporal correlation at a later time. For example, the system may correlate each pair in the list and choose the one with the highest correlation score as the potential correspondence. Alternatively or additionally, the system may conduct a temporal correlation and determine whether the correlation for the current pair, (i, j) and (i', j'), exceeds an initial threshold and has a higher correlation than a previous correlated pair including (i, j). If the correlation for the current pair exceeds the initial threshold and has a higher correlation than a previous correlated pair, the current pair may replace the previous potential correspondence. In some embodiments, the temporal correlation may be conducted by using normalized cross-correlation based on temporal gray values or normalized values of the pair of pixels to be correlated.

In some embodiments, after the initial search is complete, a hole-filling process can be conducted to interpolate initial correspondences for pixels not assigned by the process described herein. For example, due to the large restriction of the search space, approximately 85% to 95% of all correspondences may be initially found. The hole-filling process (on the correspondence level) can be used to yield 100% of the correspondences (e.g., leveraging the initially identified correspondences). In some embodiments, the hole-filling process may be conducted to identify certain points and/or pixels (e.g., oversaturated image points) that do not have correspondences, and generate approximate correspondences by interpolating related correspondences within a neighborhood of the identified points. In some embodiments, the system can apply a filter (e.g., a weak smoothing filter) to the image sequences prior to the initial correspondence assignment, which may provide 100% of the correspondences (e.g., without the need for a hole filling process). The filter may reduce noise and, to some extent, aggregate a small spatial neighborhood per temporal image. This may reduce the number of pixel-accurate correspondence intensity deviations due to perspective effects and sampling effects of the different cameras or image sensors.

In some embodiments, the described systems and methods provide for a process that is suitable for implementation on a GPU. The GPU receives a pair of stereo-temporal image sequences from the image sensors or cameras (e.g., as described with respect to act 902). The GPU can use a comparison threshold during the correspondence search. For example, the GPU can use a hamming distance threshold, HD_THRESHOLD, which is 0 (e.g., no differences allowed) or larger (e.g., some differences allowed). The GPU can store, determine, and/or receive the HD_THRESHOLD parameter. In some embodiments, the GPU can smooth the image sequences (e.g., using a weak Gaussian filter per image). Additionally or alternatively, the GPU can rectify the image sequences. For example, the GPU can rectify the image sequences to a canonical case, such that the epipolar lines are horizontal lines due to rectification.

In some embodiments, the GPU can optionally normalize the image sequences per pixel fingerprint. Based on the normalized image sequences or normalized pixel fingerprints, the GPU can create a binary sequence or binary pixel fingerprint, BINARY1, for a subset of pixels of a first camera, camera 1 (e.g., as described with respect to act 908), and another binary pixel fingerprint, BINARY1, is created for each pixel of a second camera, camera 2 (e.g., as described with respect to act 910). The GPU can select the subset of pixels for camera 1 using various techniques. For example, in some embodiments, the GPU can use a modulo operation to select the pixels. For example, the GPU can use a skipping grid, such that a selected pixel (i,j) satisfies (i modulo SKIPPING=0, j modulo SKIPPING=0). For a given pixel, a representative binary value is determined for the pixel. For example, the GPU can assign, based on the temporal normalized pixel value, a 0 or 1 for the pixel. For example, the GPU can assign the 0 or 1 by determining whether the normalized value is >=0 or <0 (or another suitable threshold). For example, the GPU may assign a 1 for a value that is >=0 (e.g., indicating brighter than average) and a 0 for a value that is <0 (e.g., indicating darker than average).

Subsequently, the GPU can generate a binary sequence per pixel for each image sequence from each camera. For example, in the case where each of camera 1 and camera 2 captures an image sequence of 16 images, the GPU can generate a 16-bit binary sequence per pixel for camera 2 and a 16-bit binary sequence per pixel on the skipping grid for camera 1. The system can initiate a search for potential correspondences using the (normalized or non-normalized) binary sequences or binary pixel fingerprints (e.g., as described with respect to act 912). For example, for each pixel on the skipping grid in camera 1, the GPU can compare each pixel in camera 2 that is in the neighborhood of the corresponding epipolar line in camera 2 with respect to their binary sequences or binary pixel fingerprints. For a potential correspondence, the GPU can check whether the pair of binary sequences is consistent for potential correspondences by checking whether the pair of binary sequences is within a certain distance threshold. For example, the system can check whether the pair of binary sequences is within a hamming distance threshold. For example, the system can determine whether, HAMMING_DISTANCE (BINARY1_i_j, BINARY1_i'_j')<=HD_THRESHOLD. If the pair of binary sequences fulfills the condition, the GPU can store the pair in a list of potential correspondences. After performing the potential correspondence step for each pixel on the skipping grid in camera 1, the GPU can generate a list of potential correspondences. For each pixel on the skipping grid in camera 1, the GPU can conduct a successive temporal-correlation with the list of potential candidates. For example, if the correlation yields a value above an initial correlation threshold, INITIAL_CORRELATION_THRESHOLD, and/or the correlation is larger than any previous potential correspondence of the list, the pair of binary sequences can be marked as the current initial correspondence.

FIG. 7 shows an illustrative process 700 for generating a binary pixel fingerprint for pixel fingerprints from a pair of temporal images, according to some embodiments. In this illustrative process, a first set of images and a second set of images of a scene are received from one or more cameras or image sensors as described herein. The second set of images may be captured from a different perspective than the first set of images to produce pairwise stereo image correspondences. For example, a temporal sequence of a number of images (e.g., 12-16 images), or another suitable number of images, of a scene may be received from the two cameras described with respect to FIG. 1. A first pixel fingerprint 702 for pixel (i, j) is determined from the first set of images and a second pixel fingerprint 752 for pixel (i', j') is determined from the second set of images, in the manner described above. The first pixel fingerprint 702 includes values $v_1$ through $v_N$, which represent the actual grayscale and/or color values of each pixel in each image in the first set of images. The second pixel fingerprint 752 includes values $v_1'$ through $v_N'$, which represent the actual grayscale and/or color values of each pixel in each image in the second set of images. Optionally, the first pixel fingerprint 702 and the second pixel fingerprint 752 are normalized to produce a first normalized pixel fingerprint 704, including values $\hat{v}_1$ through $\hat{v}_N$, and a second normalized pixel fingerprint 754, including values $\hat{v}_1'$ through $\hat{v}_N'$. The binary pixel fingerprints are generated corresponding to the first and second pixel fingerprints in the form of a first binary pixel fingerprint 706, including values $b_1$ through $b_N$, and a second binary pixel fingerprint 756, including values $b_1'$ through $b_N'$, in the manner described above and with respect to FIG. 9. FIG. 8 provides an illustrative example of process 700.

FIG. 8 shows an example 800 of a binary pixel fingerprint being generated for pixel fingerprints from a pair of images, according to some embodiments. In this example, a first set of 19 images is received from a first camera, Camera 1, and a second set of 19 images is received from a second camera, Camera 2 (e.g., where each set of images from camera 1 and camera 2 represent a stereo pair). For a given pixel position (i,j) in the firsts set of images and a corresponding pixel position (i',j') in the second set of images, a first pixel fingerprint 802 and a second pixel fingerprint 852 are generated, respectively. Each pixel fingerprint includes gray pixel values for the given pixel position across the set of images. For example, the first pixel fingerprint 802 includes gray values for pixel position (i,j) across the first of images (e.g., pixel 802 includes the grayscale values 63, 158, and so on), and the second pixel fingerprint 852 includes gray values for pixel position (i',j') across the second of images (e.g., pixel 852 includes the grayscale values 81, 186, and so on). Table 1 below shows gray values for the first pixel fingerprint 802 and the second pixel fingerprint 852. Optionally, a first normalized pixel fingerprint 804 and a second normalized pixel fingerprint 854 are generated by normalizing the first pixel fingerprint 802 and the second pixel fingerprint 852, respectively. The pixels in this example are normalized by using the formula, $\hat{v}_1=(v_t-v_{avg})\|v-v_{avg}\|_2$, where the $t^{th}$ component of vector v, $v_t$, and the average value of the components of vector v, $v_{avg}$, are subtracted, and the resulting value is divided by the length of the vector $v-v_{avg}$, resulting from subtracting $v_{avg}$ from each component of vector v. Table 1 below shows normalized values for the first normalized pixel fingerprint 804 and the second normalized pixel fingerprint 854. Finally, a first binary pixel fingerprint 806 and a second binary pixel fingerprint 856 are generated from the first normalized pixel fingerprint 804 and the second normalized pixel fingerprint 854, respectively, by comparing each normalized value against a threshold, e.g., zero, and assigning a binary value, e.g., a zero, if the normalized value is above the threshold and another binary value, e.g., a one, if the normalized value is below the threshold. Table 1 below shows binary values for the first binary pixel fingerprint 806 and the second binary pixel fingerprint 856.

TABLE 1

Exemplary Binary Pixel Fingerprint Generation

| Image Number t | Gray Value Camera 1 $v_t$ | Gray Value Camera 2 $v_t'$ | Normalized Values Camera 1 $\hat{v}_t$ | Normalized Values Camera 2 $\hat{v}_t'$ | Binary Sequence Camera 1 $b_t$ | Binary Sequence Camera 2 $b_t'$ |
|---|---|---|---|---|---|---|
| 1 | 63 | 81 | −0.201259038 | −0.201813422 | 1 | 1 |
| 2 | 158 | 186 | 0.099463283 | 0.099999004 | 0 | 0 |
| 3 | 29 | 44 | −0.308885973 | −0.308166372 | 1 | 1 |
| 4 | 24 | 38 | −0.324713464 | −0.325412797 | 1 | 1 |
| 5 | 192 | 223 | 0.207090218 | 0.206351955 | 0 | 0 |
| 6 | 142 | 168 | 0.048815313 | 0.048259731 | 0 | 0 |
| 7 | 162 | 190 | 0.112125275 | 0.111496621 | 0 | 0 |
| 8 | 89 | 110 | −0.118956087 | −0.118455704 | 1 | 1 |
| 9 | 171 | 200 | 0.140614758 | 0.140240661 | 0 | 0 |
| 10 | 208 | 241 | 0.257738188 | 0.258091228 | 0 | 0 |
| 11 | 210 | 243 | 0.264069184 | 0.263840036 | 0 | 0 |
| 12 | 192 | 223 | 0.207090218 | 0.206351955 | 0 | 0 |
| 13 | 225 | 260 | 0.311551656 | 0.312704905 | 0 | 0 |
| 14 | 206 | 239 | 0.251407192 | 0.25234242 | 0 | 0 |
| 15 | 150 | 177 | 0.074139298 | 0.074129368 | 0 | 0 |
| 16 | 102 | 124 | −0.077804611 | −0.078214047 | 1 | 1 |
| 17 | 12 | 25 | −0.362699441 | −0.362780049 | 1 | 1 |
| 18 | 53 | 70 | −0.232914019 | −0.233431867 | 1 | 1 |
| 19 | 17 | 31 | −0.346871951 | −0.345533625 | 1 | 1 |

Alternatively, the first binary pixel fingerprint 806 and a second binary pixel fingerprint 856 can be generated from the first pixel fingerprint 802 and the second pixel fingerprint 852, respectively (without performing the normalization), by comparing each value against a threshold and assigning a binary value, e.g., a zero, if the value is above the threshold and another binary value, e.g., a one, if the value is below the threshold. While Table 1 shows values for a corresponding pair of pixels for two cameras resulting in the same binary sequence or fingerprint values, given a pixel from a camera and an arbitrary pixel from another camera, the respective normalized values and resulting binary pixel fingerprint values may differ if the selected pixels are non-corresponding.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A system for determining stereo correspondence between a first pixel fingerprint of a first set of images and a second pixel fingerprint of a second set of images, the system comprising:
    a processor configured to perform the acts of:
        receiving, from one or more image sensors, a first set of images of a scene and a second set of images of the scene, wherein the second set of images is captured from a different perspective than the first set of images;
        determining a first pixel fingerprint based on the first set of images, wherein the first pixel fingerprint comprises a first set of pixel values at a first pixel position in each image in the first set of images over time;
        determining a second pixel fingerprint based on the second set of images, wherein the second pixel fingerprint comprises a second set of pixel values at a second pixel position in each image in the second set of images over time;
        generating, based on the first pixel fingerprint, a first binary pixel fingerprint, wherein the first binary pixel fingerprint comprises a first set of binary values generated by comparing each of the first set of pixel values to a threshold;
        generating, based on the second pixel fingerprint, a second binary pixel fingerprint, wherein the second binary pixel fingerprint comprises a second set of binary values generated by comparing each of the second set of pixel values to the threshold; and
        determining whether there exists a stereo correspondence between the first pixel fingerprint of the first set of images and the second pixel fingerprint of the second set of images at least in part based on comparing the first binary pixel fingerprint and the second binary pixel fingerprint and performing a successive temporal correlation based on the first pixel fingerprint and the second pixel fingerprint to determine that a potential correspondence exists between the first pixel fingerprint and the second pixel fingerprint.

2. The system of claim 1, wherein the first set of images and/or the second set of images of the scene are received from an inverse camera/projector.

3. The system of claim 1, further comprising a projector configured to project a set of light patterns on the scene, and wherein each image in the first set of images is captured using a different light pattern from the set of light patterns.

4. The system of claim 3, wherein the set of light patterns includes a fixed pattern that is translated, rotated, and/or morphed to project a different light pattern on the scene.

5. The system of claim 1, wherein:
    the first pixel fingerprint comprises the first set of pixel values as an ordered set corresponding to a temporal order of the first set of images; and
    the second pixel fingerprint comprises the second set of pixel values as an ordered set corresponding to the temporal order of the second set of images.

6. The system of claim 1, wherein generating the first set of binary values comprises:
    assigning, for each pixel value in the first set of pixel values, a zero if the pixel value is above the threshold or a one if the pixel value is not above the threshold.

7. The system of claim 1, wherein comparing the first binary pixel fingerprint and the second binary pixel fingerprint comprises comparing corresponding binary values in the first and second binary pixel fingerprints.

8. The system of claim 1, wherein the processor is configured to perform the acts of:
    normalizing the first pixel fingerprint, wherein normalizing the first pixel fingerprint comprises normalizing the first set of pixel values, at the first pixel position in each image in the first set of images, to create a first normalized pixel fingerprint comprising the first set of normalized pixel values;
    normalizing the second pixel fingerprint, wherein normalizing the second pixel fingerprint comprises normalizing the second set of pixel values, at the second pixel position in each image in the second set of images, to create a second normalized pixel fingerprint comprising second set of normalized pixel values; and
    wherein:
        generating the first binary pixel fingerprint comprises generating the first binary pixel fingerprint based on the first normalized pixel fingerprint; and
        generating the second binary pixel fingerprint comprises generating the second binary pixel fingerprint based on the second normalized pixel fingerprint.

9. The system of claim 8, wherein the processor is configured to perform the acts of:
    generating, based on the first normalized pixel fingerprint, a third binary pixel fingerprint, wherein the third binary pixel fingerprint comprises a third set of binary values generated by comparing an absolute value of each of the first set of normalized pixel values to a confidence threshold; and
    generating, based on the second normalized pixel fingerprint, a fourth binary pixel fingerprint, wherein the fourth binary pixel fingerprint comprises a fourth set of binary values generated by comparing an absolute value of each of the second set of normalized pixel values to the confidence threshold.

10. The system of claim 9, wherein comparing the first binary pixel fingerprint and the second binary pixel fingerprint comprises comparing:
    an OR value of corresponding binary values in the first, third, and fourth binary pixel fingerprints; and an OR value of corresponding binary values in the second, third, and fourth binary pixel fingerprints.

11. The system of claim 1, wherein comparing the first binary pixel fingerprint and the second binary pixel fingerprint comprises determining whether corresponding binary values in the first and second binary pixel fingerprints are within a threshold hamming distance.

12. The system of claim 1, wherein, prior to determining the first pixel fingerprint in the first set of images, the processor is configured to apply an image filter to each image in the first set of images.

13. The system of claim 1, wherein performing a successive temporal correlation based on the first pixel fingerprint and the second pixel fingerprint to determine that a potential correspondence exists between the first pixel fingerprint and the second pixel fingerprint comprises:
  performing the successive temporal correlation to yield a correlation value between the first pixel fingerprint and the second pixel fingerprint; and
  determining, based on the correlation value exceeding a correlation threshold and prior correlation values for prior pairs of pixel fingerprints, that a potential correspondence exists between the first pixel fingerprint and the second pixel fingerprint.

14. The system of claim 13, wherein determining whether there exists a stereo correspondence between the first pixel fingerprint of the first set of images and the second pixel fingerprint of the second set of images comprises:
  performing a hole filling operation to interpolate initial correspondences for pixel fingerprints not yet determined to have a potential correspondence to another pixel fingerprint.

15. The system of claim 1, wherein the first pixel position and/or the second pixel position are selected based on a skipping parameter.

16. The system of claim 15, wherein the first pixel position, $(i_1, j_1)$, is selected based on the skipping parameter, S, such that $i_1$ modulo S=0 and $j_1$ modulo S=0.

17. A method for determining stereo correspondence between a first pixel fingerprint of a first set of images and a second pixel fingerprint of a second set of images, comprising:
  using a processor to perform the acts of:
    receiving, from one or more image sensors, a first set of images of a scene and a second set of images of the scene, wherein the second set of images is captured from a different perspective than the first set of images;
    determining a first pixel fingerprint based on the first set of images, wherein the first pixel fingerprint comprises a first set of pixel values at a first pixel position in each image in the first set of images over time;
    determining a second pixel fingerprint based on the second set of images, wherein the second pixel fingerprint comprises a second set of pixel values at a second pixel position in each image in the second set of images over time;
    generating, based on the first pixel fingerprint, a first binary pixel fingerprint, wherein the first binary pixel fingerprint comprises a first set of binary values generated by comparing each of the first set of pixel values to a threshold;
    generating, based on the second pixel fingerprint, a second binary pixel fingerprint, wherein the second binary pixel fingerprint comprises a second set of binary values generated by comparing each of the second set of pixel values to the threshold; and
    determining whether there exists a stereo correspondence between the first pixel fingerprint of the first set of images and the second pixel fingerprint of the second set of images at least in part based on comparing the first binary pixel fingerprint and the second binary pixel fingerprint and performing a successive temporal correlation based on the first pixel fingerprint and the second pixel fingerprint to determine that a potential correspondence exists between the first pixel fingerprint and the second pixel fingerprint.

18. At least one non-transitory computer-readable storage medium storing processor-executable instructions that, when executed by the at least one computer hardware processor, cause the at least one computer hardware processor to perform the acts of:
  receiving, from one or more image sensors, a first set of images of a scene and a second set of images of the scene, wherein the second set of images is captured from a different perspective than the first set of images;
  determining a first pixel fingerprint based on the first set of images, wherein the first pixel fingerprint comprises a first set of pixel values at a first pixel position in each image in the first set of images over time;
  determining a second pixel fingerprint based on the second set of images, wherein the second pixel fingerprint comprises a second set of pixel values at a second pixel position in each image in the second set of images over time;
  generating, based on the first pixel fingerprint, a first binary pixel fingerprint, wherein the first binary pixel fingerprint comprises a first set of binary values generated by comparing each of the first set of pixel values to a threshold;
  generating, based on the second pixel fingerprint, a second binary pixel fingerprint, wherein the second binary pixel fingerprint comprises a second set of binary values generated by comparing each of the second set of pixel values to the threshold; and
  determining whether there exists a stereo correspondence between the first pixel fingerprint of the first set of images and the second pixel fingerprint of the second set of images at least in part based on comparing the first binary pixel fingerprint and the second binary pixel fingerprint and performing a successive temporal correlation based on the first pixel fingerprint and the second pixel fingerprint to determine that a potential correspondence exists between the first pixel fingerprint and the second pixel fingerprint.

19. A system for determining stereo correspondence between a first pixel fingerprint of a first set of images and a second pixel fingerprint of a second set of images, the system comprising:
  a processor configured to perform the acts of:
    receiving, from one or more image sensors, a first set of images of a scene and a second set of images of the scene, wherein the second set of images is captured from a different perspective than the first set of images;
    determining a first pixel fingerprint based on the first set of images, wherein the first pixel fingerprint comprises a first set of pixel values at different positions in space and/or time relative to a first pixel position in each image in the first set of images;

determining a second pixel fingerprint based on the second set of images, wherein the second pixel fingerprint comprises a second set of pixel values at different positions in space and/or time relative to at a second pixel position in each image in the second set of images;

generating, based on the first pixel fingerprint, a first binary pixel fingerprint, wherein the first binary pixel fingerprint comprises a first set of binary values generated by comparing each of the first set of pixel values to a threshold;

generating, based on the second pixel fingerprint, a second binary pixel fingerprint, wherein the second binary pixel fingerprint comprises a second set of binary values generated by comparing each of the second set of pixel values to the threshold; and determining whether there exists a stereo correspondence between the first pixel fingerprint of the first set of images and the second pixel fingerprint of the second set of images at least in part based on comparing the first binary pixel fingerprint and the second binary pixel fingerprint and performing a successive temporal correlation based on the first pixel fingerprint and the second pixel fingerprint to determine that a potential correspondence exists between the first pixel fingerprint and the second pixel fingerprint.

* * * * *